Dec. 25, 1928.
A. F. FROUSSARD
1,696,195
CUTTER HEAD
Original Filed Feb. 6, 1922
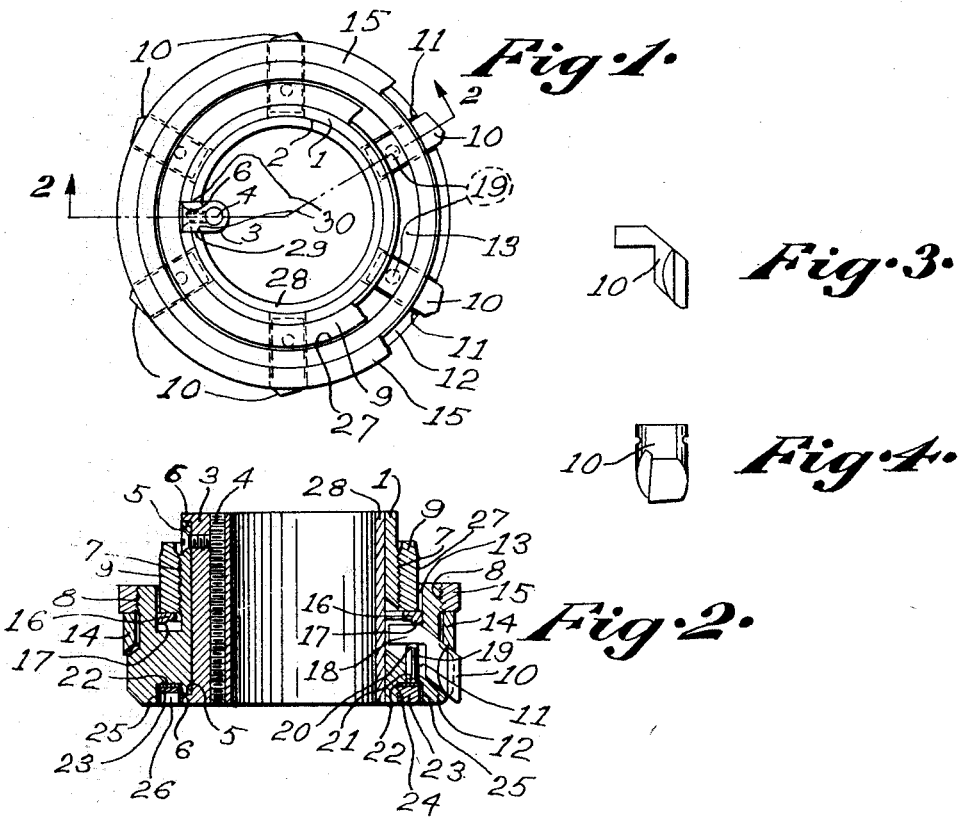
Inventor:
Albert F. Froussard,
By Hugh K. Wagner,
Attorney.

Patented Dec. 25, 1928.

1,696,195

UNITED STATES PATENT OFFICE.

ALBERT F. FROUSSARD, OF ST. LOUIS, MISSOURI.

CUTTER HEAD.

Original application filed February 6, 1922, Serial No. 534,466. Divided and this application filed October 27, 1924. Serial No. 745,980.

This invention relates to a boring head, and especially a boring head adapted for use in connection with a machine for boring cylinders of internal-combustion engines and the like, a machine such as is described in my prior United States Patent, Number 1,516,815, granted November 25, 1924, and of which this application is a division, in so far as it relates to the preferred form described hereinafter.

One of the objects of this invention is to provide a boring head for readily and accurately adjusting its cutting means to any desired size of bore.

Another object is to provide a boring head having means for securely holding its working tools or cutters after they have been adjusted.

Another object is the provision of a boring head which possesses strength, durability, accessibility, and ruggedness of construction.

Another object is to provide means whereby a plurality of tools held in the boring head may be simultaneously adjusted and secured.

Divers other objects and advantages will be apparent as the description proceeds.

In the accompanying drawings forming part of this specification, in which like numbers of reference denote like parts wherever they occur, Figure 1 is a plan view of this preferred form of this invention, with certain parts broken away;

Figure 2 is a sectional view taken on the irregular line 2—2 of Figure 1; and

Figures 3 and 4 are side and end elevations, respectively, of one of the cutter tools as it appears when detached from the boring head.

Referring to the preferred form depicted in Figures 1 and 2, the annular cutter head 1 is bored centrally at 2 to accommodate the driving spindle of the boring machine, a block 3 functioning as a feather key in the said spindle and having a tapped hole 4 therein for the reception of the feed screw of the machine, as will be understood by those skilled in the art. To relieve the said screw from transverse shearing strains, incident to the rotation of the cutter-head 1, radial recesses 5, communicating with central hole 2 in cutter-head 1, are provided, one at the top, and one at the bottom, respectively of cutter-head 1, to accommodate flanges 6 on the ends of the block 3.

The cutter-head 1 is externally screw-threaded at 7 and again at 8. Collar 9 is internally screw-threaded to cooperate with thread 7, and is adjustable inwardly and outwardly of the cutter-head for causing the cutters 10 to be projected from the cutter-head a greater or lesser degree according to whether it is required to bore a small or large cylinder-bore, the device being thus not only adapted for cylinder of standard sizes, but, also, for special types having extra large bores. In the latter instance, the cutters 10 will be forced to their utmost extent radially outward through openings 11 in the lower part of the outer ring or wall 12 of cutter-head 1. Collar or ring 9 is preferably arranged to revolve principally within groove 13.

When the cutters 10 have been adjusted inwardly or outwardly, as may be desired, by collar 9, a collar 14, for distributing the pressure against the several cutters, may be forced down upon them by internally-threaded ring 16, cooperating with threads 8 formed upon the exterior of the main body of cutter-head 1.

A ring 16 having a bead 17 underlies collar 9, and the said bead rests upon the arm 18 of cutter 19, while underneath the said arm 18 is a loose pin 19 having rounded upper and lower ends 20 and 21, the latter resting upon a washer 22, resting on an internally-threaded ring 23, cooperating with threads 24 inside groove 25 in the lower surface of the main body of the cutter-head 1. Ring 23 has radial slots 26 in its bottom surface to facilitate its engagement with a wrench or other suitable tool when it is desired to screw or unscrew the ring 23.

When the cutters 10 have been inserted through openings 11 they are held in place from above by the bead 17 on ring 16 and the ring 9, and from underneath by the loose pins 19, washer 22, and ring 23. Pins 19 having rounded upper and lower ends 20 are located somewhat inwardly with relation to casing 1, the bead 17 carried by ring 16 thus forming a fulcrum on the head 20 of cover 11 which results in the tilting downwardly and inwardly of the cutter, thereby resulting in a more secure gripping of the cutter by the respective parts. Both ring 16 and ring 23 being screw-threadedly adjustable, it is evident that considerable latitude of adjustment is afforded for the cutters 10, because arm 18 rocks on bead 17 like on a fulcrum, and, besides, the pins 19 as well as bead 17 can be raised or lowered. When ring 9 is screwed downwardly, the pressure on arms 18 is such as to force all the cutters 10 outwardly through openings 11. This movement can be made even larger by unscrewing ring 23 downwardly. Screwing rings 23 and 9 upwardly, or either of them, will allow the retrocession of cutters 10. Even the mere screwing upwardly of ring 9 will permit this movement, and if the tool be then inserted in a smaller bore cylinder the cutters 10 will do their work.

A scale may, if desired, be marked upon the outer periphery 27 of ring 9, so as to indicate to the comparatively unskilled workman exactly how to adjust the instrument for use in boring a cylinder of any known size.

A sleeve 28 tightly fitting in or otherwise fixed to the inside of cutter-head 1 closes the openings of the passages 11 into the central bore 2 and has a slot at 29 for clearing the feed-nut 3. The sides 30 of the sleeve 28 receive part of the force exerted by the feed-nut 3 in turning the cutter-head 1, and thereby relieve the force on the projections 6 to that extent.

Of course, the various parts will be made of suitable materials, the cutters being preferably made of tool steel.

Having thus described this invention, I hereby reserve the benefit of all changes in form, arrangement, order, or use of parts, as it is evident that many minor changes may be made therein without departing from the spirit of this invention or the scope of the following claims.

I claim:

1. A cutter head structure comprising an annular body having at its side an opening passing therethrough, the longitudinal dimension of said opening being disposed generally radially with relation to the body and pitched at an acute angle to the axis thereof, a plurality of cutters slidably insertible within said opening, each of said cutters having an inwardly directed projection presenting parallel top and bottom edges, a clamping ring having a downwardly directed bead for engaging the top edge of the projection on said cutter, a pin engaging the bottom edge of said projection, the points of engagement of said bead and said pin with the top and bottom edges of said projection being out of vertical alignment for forcing the cutter tightly in its respective opening and a collar mounted for sliding movement in the body in a direction parallel with the axis thereof and presenting a beveled end engaging the edge of said outer end portion of said cutter.

2. A cutting tool head provided with divergent cutter-receiving sockets, cutters in the sockets, the head being recessed longitudinally for a portion of its length, the recess being threaded on one of its walls, a ring internally screw-threaded for cooperating with the screw-threaded wall of the recess, a ring having a bead adjacent its periphery interposed between the first-named ring and the inwardly projecting end of the cutter and adapted to have reciprocal movement within the recess, a pin supported by the cutter head at a point closer to the axis thereof than the bead and supporting the under-side of the inwardly extending end of the cutter.

3. A cutting tool head provided with divergent cutter-receiving sockets, cutters in the sockets, the head being recessed longitudinally for a portion of its length, the recess being threaded on one of its walls, a ring internally screw-threaded for cooperating with the screw-threaded wall of the recess, a ring having a bead adjacent its periphery interposed between the first-named ring and the inwardly projecting end of the cutter and adapted to have reciprocal movement within the recess, a pin supported by the cutter head at a point closer to the axis thereof than the head and supporting the under-side of the inwardly extending end of the cutter and a second ring in screw-threaded engagement with the outer wall of said recess and adapted to contact with the outer portion of the cutter.

4. A cutting tool head provided with divergent cutter-receiving sockets, cutters in the sockets, the head being recessed longitudinally for a portion of its length, the recess being threaded on one of its walls, a ring internally screw-threaded for cooperating with the screw-threaded wall of the recess, a ring having a bead adjacent its periphery interposed between the first-named ring and the inwardly projecting end of the cutter and adapted to have reciprocal movement within the recess, a pin supported by the cutter head at a point closer to the axis thereof than the bead and supporting the underside of the inwardly extending end of the cutter, said pin being capable of adjustment longitudinally of the head.

In testimony whereof I hereunto affix my signature.

ALBERT F. FROUSSARD.